Nov. 16, 1937. H. PAXTON 2,099,224
LEMON WASHER
Filed May 31, 1935
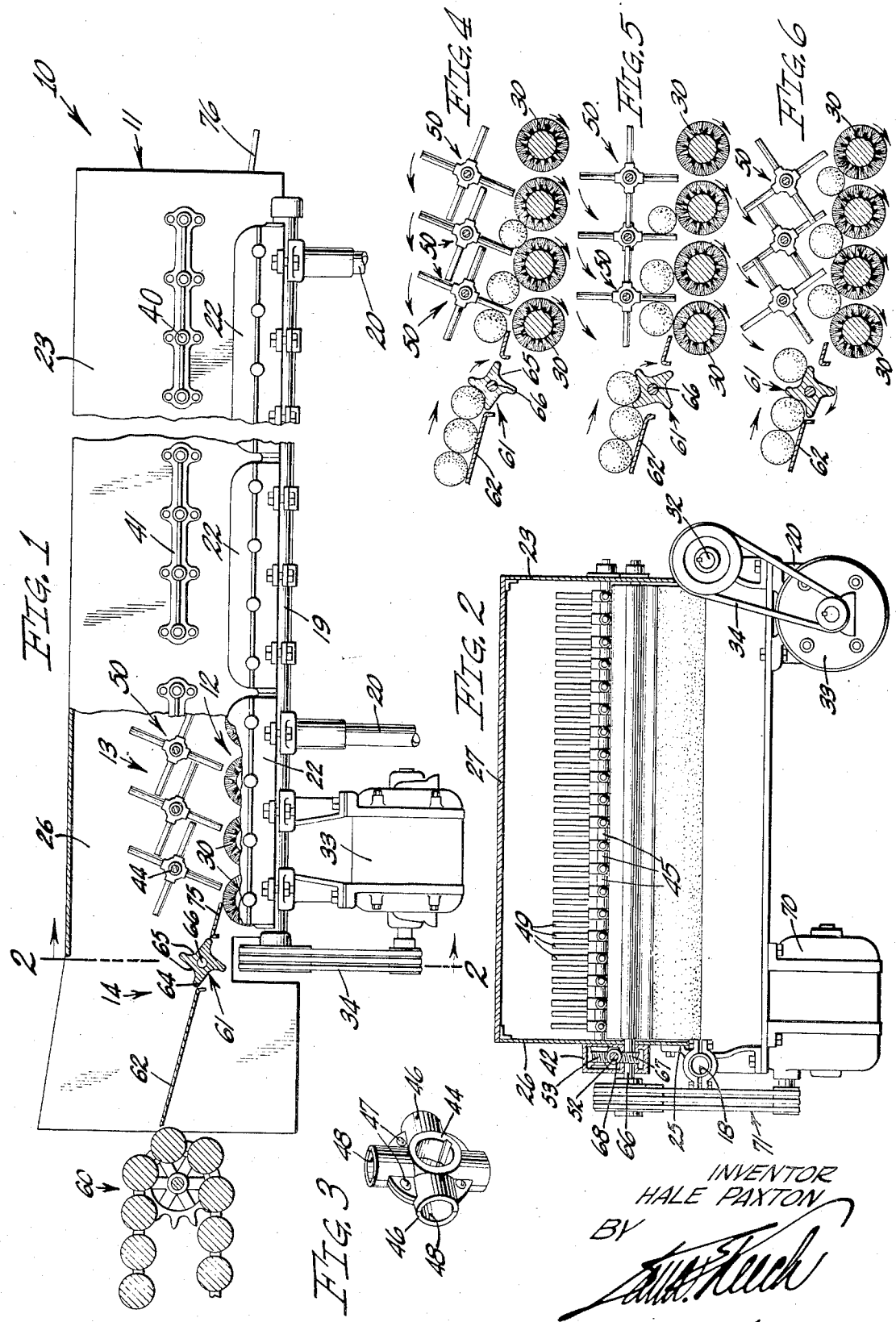

Patented Nov. 16, 1937

2,099,224

UNITED STATES PATENT OFFICE 2,099,224

LEMON WASHER

Hale Paxton, Santa Ana, Calif., assignor, by mesne assignments, to Food Machinery Corporation, a corporation of Delaware Application May 31, 1935, Serial No. 24, 4 Claims. (Cl. 146—202)

My invention relates to the preparation of agricultural produce for market and has particular reference to a novel clean out mechanism for use in a machine for washing, or otherwise treating fruit such as oranges, lemons, etc.

Before being packed for shipment, the citrus fruits are soaked in cleaning solution to loosen the dirt, scale and other foreign material thereon. After being soaked, the fruit is conveyed to a washing machine and thoroughly scrubbed to remove the surface impurities loosened during the soaking of the fruit.

The most commonly used washer in the citrus industry consists of a frame in which a number of transverse, rotary brushes are mounted. The fruit to be washed is conveyed to the washer and discharged onto the rotating brushes. The fruit tends to remain in the valleys between the brushes until being displaced therefrom and crowded into the next valley by the feeding of additional fruit onto the brushes.

When the feeding of fruit to these washers is stopped, the valleys between each pair of the rotary brushes remain full of residual fruit which must be removed or "cleaned out" before washing another lot of fruit.

Due to the fact that the fruit of many growers is packed in a single packing house, and the fact that the fruit of each grower is handled separately from the fruit of other growers, it is necessary to clean out the washers after washing the fruit of each grower.

When lemons are washed in a transverse brush washer, care must be exercised to limit the supply of fruit so as to prevent overfilling the washer. When too much fruit is allowed to pass through the machine, the fruit tends to pile up in the valleys between the brushes resulting in injury to the fruit by the projecting stem ends thereof.

It is an object of my invention to provide a clean out mechanism for a transverse brush washer that will permit the feeding of a relatively large quantity of fruit to the washer (as many as 120 rows of fruit per minute) and yet keep the successive rows of fruit segregated so as to prevent the fruit from piling up.

Another object of my invention is to provide a clean out mechanism that is exceptionally gentle in operation so as not to injure the fruit engaged thereby.

Further objects and advantages of my invention will become apparent in the following description taken in connection with the accompanying drawing, in which:
Fig. 1 is a fragmentary, side elevational view of a preferred embodiment of my invention, a portion thereof being broken away to more clearly disclose the construction thereof.

Fig. 2 is a vertical, sectional view taken on the line 2—2 of Fig. 1.

Fig. 3 is a perspective view of a portion of the preferred embodiment of my invention.

Figs. 4, 5 and 6 are diagrammatic views showing the operation of the preferred embodiment of my invention.

Referring specifically to the drawing, a fruit washer 10, comprising a preferred embodiment of my invention is shown in Fig. 1, this washer including a frame 11, a brushing unit 12, a clean out mechanism 13, and a fruit delivery mechanism 14.

The frame 11 includes horizontal pipes 18 and 19 supported from the floor by vertical pipes 20. Clamped, or otherwise secured to the pipe 19 are gear housings 22 to which a side plate 23 is secured. Fixed on the pipe 18 are brackets 25, shown in Fig. 2, to which a side plate 26 is secured. Removably mounted on top of the washer 10 is a cover plate 27.

The brushing unit 12 includes a plurality of rotary brushes 30, these being journalled in suitable bearings formed on the aforementioned brackets 25 and housings 22. Rotatably mounted within the pipe 19 is a shaft 32 driven by a motor 33 through the medium of a V-belt drive 34. Keyed on the shaft 32 are spiral gears (not shown) which mesh with suitable gears (not shown) within the housings 22, the last mentioned gears being connected with the brushes 30.

The clean out mechanism 13 includes a plurality of transverse shafts 40 journalled in bearings 41 on the plate 23 and in suitable bearings provided by gear housings 42 on the plate 26 as shown in Fig. 2. Keyed on each of the shafts 40 are impellers 50 which include split hubs 44 positioned in spaced relation on the shafts 40 by spacers 45. As shown in Fig. 3, each of the hubs 44 includes a pair of identical halves 46 held together by screws 47. The hubs 44 are formed to provide sockets 48 for receiving the ends of fruit impeller fingers 49, the latter being made of rubber or the like.

As seen in Fig. 2, the impellers 50 of one of the shafts 40 are offset relative to those of the shafts adjacent thereto to permit the fingers 49 to pass in overlapping relation as shown in Figs. 5 and 6.

Journalled in the housings 42 is a shaft 52 having spiral gears (not shown) keyed thereto, these being positioned to mesh with gears 53 fixed on the ends of the shafts 40, each of the shafts 40 being driven in the same direction at a uniform speed by the shaft 52.

The fruit delivery mechanism 14 includes fruit conveyor 60 and a fruit feeding element 61. The conveyor 60 is mounted in any suitable manner adjacent the intake end of the washer 10 for the purpose of delivering rows of fruit onto a suitable drop board 62 provided between the plates 23 and 26. The element 61, formed to provide ridges 64 and channels 65, is fixed to a shaft 66 which is suitably journalled at one end thereof on the side plate 23 and at the other end thereof in the aforementioned housing 42 as shown in Fig. 2. The shaft 66 drives the shaft 52 of the clean out mechanism 13 by means of spiral gears 67 and 68 as shown in Fig. 2, the shaft 66 being driven by a motor 70 by means of a suitable V-belt drive 71. The shafts 40 and 66 are driven at equal speeds and in opposite directions of rotation as shown by the arrows of Fig. 4. Provided between the side plates 23 and 26 adjacent the feeding element 61 is a drop board 75, the latter being in line with the aforementioned drop board 62.

Operation

When the motor 33 is energized, the brushes 30 are all driven at a relatively high rate of speed in clockwise direction as viewed in Fig. 1, and when the motor 70 is energized, the feeding element 61 and clean out shafts 40 are driven relatively slowly, the element 61 being driven clockwise and the shafts 40 counterclockwise. The conveyor 60 is driven at the proper speed to deliver four rows of fruit for each complete revolution of the element 61.

Each row of fruit discharged from the conveyor 60 rolls down the drop board 62 and is retained in one of the channels 65 of the feeding element 61. As the element 61 rotates, the row of fruit is carried thereover and discharged onto the drop board 75. At this time the fingers 49 of the foremost of the fruit impeller units 50 are in position to receive the row of fruit as shown in Fig. 4. As the rows of fruit are delivered onto the brushes 30 by the element 61, each row is separated from each other row by the fingers 49 as shown in Fig. 5. The timed rotation of the impellers 50 urges each row of fruit entirely through the washer 10, the fruit being finally discharged onto a suitable outlet drop board 76 shown in Fig. 1. At the completion of each lot of fruit, the conveyor 60 empties itself and the residual fruit in the washer 10 is completely removed therefrom by the clean out mechanism 13.

The provision of the four-fingered impellers 50 enables the clean out mechanism 13 to carry four times as many rows of fruit through the washer 10 as could be carried if the impellers 50 had but one finger travelling at the same velocity as the four fingers. If impellers having but one finger were used, these would have to be run four times faster than the impellers 50 to handle the same amount of fruit, this rate of speed would be objectionable as the fingers would throw the fruit from the brushes and greatly reduce the efficiency of the washer. It is thus clear that the four-fingered impellers 50 are capable of handling large quantities of fruit while being rotated at a relatively slow speed, and regardless of the amount of fruit delivered to the washer 10, it is clear that each row of fruit is separated from each other row.

Although I have shown and described but one preferred form of my invention, it is to be understood that many modifications and changes might be made therein without departing from the spirit of the invention or the scope of the appended claims.

I claim as my invention:

1. In combination: a series of transverse fruit treating rollers providing a series of valleys between said rollers; means for rotating said rollers in the same direction to treat fruit resting in said valleys; a plurality of rotary clean out members, one of which is disposed over and substantially parallel with each of said valleys; a plurality of rows of spaced fingers extending substantially radially from each of said members, the fingers of each member being axially offset from the fingers of adjacent members and of such length as to pass between said last mentioned fingers when said members are rotated; and means to rotate said members in the same direction to maintain corresponding rows of fingers on all said members substantially parallel at all times during rotation of said members.

2. In combination: a series of transverse fruit treating rollers providing a series of valleys between said rollers; means for rotating said rollers in the same direction to treat fresh, whole fruit resting in said valleys; a plurality of rotary clean out members, one of which is disposed over and substantially parallel with each of said valleys; fingers on said members forming a series of radially open pockets about each such member; and means to rotate said members in the same direction, the fingers of adjacent members interfitting with and by passing each other during such rotation to transfer the fresh whole fruit confined in each downwardly disposed pocket of each member into the pocket next downwardly disposed of the member immediately in advance thereof.

3. In combination: a series of transverse fruit treating rollers providing a series of valleys between said rollers; means for rotating said rollers in the same direction to treat fresh whole fruit resting in said valleys; a plurality of rotary clean out members one of which is disposed over, and substantially parallel with, each of said valleys; four uniformly spaced blades comprising rows of rubber fingers provided to extend axially from each of said members, the fingers of each member extending close to surfaces of the rollers therebeneath and to the axes of adjacent members and by-passing the fingers of said adjacent members; and means to rotate said members in the same direction at the same rate of speed.

4. In combination: a series of transverse fruit treating rollers providing a series of valleys between said rollers; means for rotating said rollers in the same direction to treat fruit resting in said valleys; a plurality of rotary clean out members, one of which is disposed over and substantially parallel with each of said valleys; a plurality of rows of spaced fingers extending substantially radially from each of said members, the fingers of each member being axially offset from the fingers of adjacent members and of such length as to pass between said last mentioned fingers when said members are rotated; and means to rotate said members so that the R. P. M. of any given member per row of fingers thereon is the same as the R. P. M. for each of the other members per row of fingers thereon.

HALE PAXTON.